US009702966B2

(12) United States Patent
Batcheller et al.

(10) Patent No.: US 9,702,966 B2
(45) Date of Patent: Jul. 11, 2017

(54) SYNTHETIC UNDERWATER VISUALIZATION SYSTEM

(71) Applicants: Barry D. Batcheller, West Fargo, ND (US); Jeffrey L. Johnson, West Fargo, ND (US); Derek B. Aslakson, Fargo, ND (US)

(72) Inventors: Barry D. Batcheller, West Fargo, ND (US); Jeffrey L. Johnson, West Fargo, ND (US); Derek B. Aslakson, Fargo, ND (US)

(73) Assignee: Appareo Systems, LLC, Fargo, ND (US)

( * ) Notice: Subject to any disclaimer, the term of this patent is extended or adjusted under 35 U.S.C. 154(b) by 779 days.

(21) Appl. No.: 14/028,095

(22) Filed: Sep. 16, 2013

(65) Prior Publication Data

US 2015/0078123 A1    Mar. 19, 2015

(51) Int. Cl.
| | |
|---|---|
| G01S 15/00 | (2006.01) |
| G01S 7/00 | (2006.01) |
| G01S 17/89 | (2006.01) |
| G01S 15/02 | (2006.01) |
| G01S 7/62 | (2006.01) |
| G01S 15/89 | (2006.01) |

(52) U.S. Cl.
CPC ............ *G01S 7/003* (2013.01); *G01S 7/6245* (2013.01); *G01S 7/6272* (2013.01); *G01S 15/025* (2013.01); *G01S 15/8902* (2013.01); *G01S 17/89* (2013.01)

(58) Field of Classification Search
USPC .......................................................... 367/88
See application file for complete search history.

(56) References Cited

PUBLICATIONS

Stewart, P. and Canter, P. Creating a Seamless Model of the Littoral and Near Shore Environments. International LiDAR Mapping Forum, New Orleans, Jan. 2009.*
Toal, Daniel, et al. "A flexible, multi-mode of operation, high-resolution survey platform for surface and underwater operations." Underwater Technology 28.4 (2009): 159-174.*
Bellarbi, Abdelkader, et al. "Underwater augmented reality game using the DOLPHYN." Proceedings of the 18th ACM symposium on Virtual reality software and technology. ACM, 2012.*

(Continued)

*Primary Examiner* — James Hulka
*Assistant Examiner* — Jonathan Armstrong
(74) *Attorney, Agent, or Firm* — Law Office of Mark Brown, LLC; Mark E. Brown

(57) ABSTRACT

A synthetic underwater visualization system (SUVS) comprising a real-time graphics software engine, a sophisticated underwater environmental sensor, a fixed-base database, and a retrieval system designed to accept and assimilate into a common database bathymetric and environmental information acquired from around the world by components of other deployed SUVS sensing systems. SUVS is capable of sensing, modeling, and realistically displaying underwater environments in real-time, and will foster widespread utilization in the areas of homeland security, commercial and recreational maritime navigation, bathymetric data collection, and environmental analysis. The technology will also be readily adaptable and highly desirable in non-marine applications.

11 Claims, 6 Drawing Sheets

(56) References Cited

PUBLICATIONS

Wheless, G. H., A. Valle-Levinson, and W. Sherman. "Virtual reality in oceanography." Oceanography 8.2 (1995): 52-58.*

Wheless, Glen H., et al. "Virtual chesapeake bay: Interacting with a coupled physical/biological model." IEEE Computer Graphics and Applications 16.4 (1996): 52-57.*

DeGregorio, Edward A., et al. "Adapting Commercial Video Game Technology to Military Simulation Applications." SimTecT 2006 (2006): 257-262.*

Drap, P., et al. "Photogrammetry for virtual exploration of underwater archeological sites." Proceedings of the 21st international symposium, CIPA. 2007.*

Haydar, M. Chapman, Paul, et al. "Virtual Exploration of Underwater Archaeological Sites: Visualization and Interaction in Mixed Reality Environments." (2008): 141-148.*

Coveney, Seamus. "Integration of INFOMAR Bathymetric LiDAR with external onshore LiDAR datasets." (2009).*

Hermann, Albert J., and Christopher W. Moore. "Visualization in fisheries oceanography: New approaches for the rapid exploration of coastal ecosystems." Computers in Fisheries Research. Springer Netherlands, 2009. 317-336.*

Chapman, Paul, Warren Viant, and Mitchell Munoko. "Constructing Real-Time Immersive Marine Environments for the Visualization of Underwater Archaeological Sites." (2010).*

Haydar, Mahmoud, et al. "Virtual and augmented reality for cultural computing and heritage: a case study of virtual exploration of underwater archaeological sites (preprint)." Virtual reality 15.4 (2011): 311-327.*

Guenther, Gary C., et al., "Design considerations for acheiving high accuracy with the SHOALS bathymetric lidar system", *CIS Selected Papers: Laser Remote Sensing of Natural Waters: From Theory to Practice*, 54, (Nov. 13, 1996).

* cited by examiner

SYNTHETIC UNDERWATER VISUALIZATION SYSTEM

BACKGROUND OF THE INVENTION

Field of the Invention

The present invention relates generally to the field of bathymetry, and specifically to a system for creating a detailed synthetic visualization of an underwater environment.

Description of the Related Art

Current technology used for bathymetry and underwater visualization is deficient in two critical areas: sensors are incapable of high-resolution three-dimensional measurement, and software is incapable of realistically representing large, complex, dynamically changing underwater environments in real-time. As a result of these deficiencies, it has not previously been possible to develop and commercialize low-cost, high-resolution, real-time, three-dimensional underwater visualization systems.

Current State-of-the-Art Underwater Sensors:

Objects on the ocean floor that threaten navigation or national security in coastal waters, such as bottom-mounted mines, and other objects of military or commercial interest, are often obscured due to turbidity in the water column. Standard camera systems, operating passively with ambient sunlight or in combination with flood and strobe lights, can typically image through one to two optical attenuation lengths (1/k; where "k" is the diffuse attenuation coefficient).

Light is attenuated as it passes through water. That is, light gradually lessens in intensity as it passes through water (as well as other mediums, including air) as it is scattered and or absorbed. In clear water, light with the longest wavelengths are absorbed first, so red, orange, and yellow light is absorbed in shallow water than is blue and violet light. It is this fact that gives clear ocean waters a deep-blue appearance when viewed from above. Other material suspended in water, such as dirt from the bed of the body of water, chemicals, and other detritus, can drastically increase the amount of absorption and scattering of light particles and cause the light to be attenuated faster.

In the 1990s, new imaging systems based on laser illumination, (synchronous laser scan and imaging LIDAR approaches), have increased the imaging range to four to five attenuation lengths. However, light attenuation in very turbid water, such as associated with river plumes and suspended bottom sediments, render even these systems ineffective due to the limited stand-off range necessary for generating high quality imagery and the associated decrease in survey rate. Therefore, the need remains to develop compact optical systems capable of imaging through greater ranges and deployable on a variety of manned and unmanned platforms.

No low-cost, commercial, three-dimensional bathymetric LIDAR systems currently exist. However, there are a number of commercially deployed high-cost Airborne LIDAR Bathymetry (ALB) systems. ALB is an airborne survey methodology utilizing an aircraft-mounted LIDAR system to rapidly and accurately measure seabed depths and topographic elevations. These systems utilizes two wavelengths of laser light, one to measure the surface of the body of water and the other to penetrate into the body of water to measure the depth of the water.

Probably the most advanced ALB system is the SHOALS system. The SHOALS technology is owned and operated by the Joint Airborne LIDAR Bathymetry Technical Center of Expertise (JALBTCX), which is a unique partnership between the South Atlantic Division of the US Army Corps of Engineers (USACE), the Naval Meteorology and Oceanography Command/Naval Oceanographic Office, and USACE's Engineer Research and Development Center.

Although the technology is quite advanced, only a few systems exist and they are extremely expensive to own and operate. The SHOALS system utilizes very high power YAG lasers, expensive photomultiplier tubes, and stabilization systems that are intricate and expensive. These systems utilize complex algorithms to deal with surface reflection and light dispersion.

In addition to bathymetric applications, three-dimensional scanning LIDAR has recently been developed for acquiring high-density environmental ranging information on land (in air). An example of this type of system is the DeltaSphere-3000 Laser 3D Scene Digitizer being marketed by 3rdTech, Inc. This system is based on technology developed by Dr. Lars Nyland at the University of North Carolina at Chapel Hill. The system is capable of taking millions of range measurements using scanning 3D LIDAR in order to create a three-dimensional graphic image of the scanned space.

Terrain Rendering State-of-the-Art:

The state-of-the-art in visual, computer generated terrain rendering varies from simple graphics depictions created on personal computers (PC) to sophisticated, very expensive real-time simulators. In general, real-time rendering of detailed terrains poses a significant problem due to the vast amounts of data and large number of computations that are required to accurately represent complex terrain models.

On the low end of the complexity scale are graphics generated by PCs, principally used for computer gaming. Modern PCs use dedicated graphics processing units (GPU) to help offload real-time graphic rendering related work from the CPU. However, due to memory storage and computational limitations, the PC is inadequate when it comes to rendering large, highly-detailed terrain models that require a large number of polygons to accurately represent the 3D image. In an effort to overcome this problem and still maintain highly-realistic computer-generated terrains, the gaming industry has implemented a distributed computing model for delivering new and improved content to multiple clients. This content is created and processed on a centralized server, which offloads the massive storage and computational work from the PC, and is used in today's Massively Multi-player On-line Games (MMOG).

The rendering of large, detailed terrains for military simulations is accomplished using large and expensive image generator (IG) systems, such as the Harmony Military Simulator System developed by the Evans and Sutherland Company.

In addition to the hardware limitations described above, there exist significant software challenges to depicting large, moving terrains in real-time. To address some of these problems, Level of Detail (LOD) algorithms have been developed. These algorithms lower the amount of detail in terms of triangles drawn to the screen in regions which are farther away from the operator, or in areas where the number of triangles can be reduced without causing much loss in detail. By so doing, these algorithms provide high detail for objects that are in the main field of view, while limiting the overall number of triangles displayed, thereby reducing graphics-related computations. Popular LOD algorithms in use today include ROAM, SOAR, Adaptive Quadtree, and Chunking.

Although surface terrain information databases have improved as more of the world is mapped in increasing levels of detail and accuracy, underwater bathymetric databases are much further behind and for the most part remain woefully out of date. In waterways, where there are high currents such as rivers and coastal areas, the underwater landscape is in a constant state of change and not regularly measured and corrected. Furthermore, present systems do not learn about these changes and automatically update a common national or international database, nor is this information gathered from a number of geographically displaced systems and annotated for storage and redistribution.

What is needed in the art is a system that solves these problems by providing and combining new-to-the-world technologies in underwater environmental sensing and real-time underwater graphics and terrain visualization software.

BRIEF SUMMARY OF THE INVENTION

The present invention is a modular, mobile synthetic underwater visualization system (SUVS). SUVS is a commercially-viable, augmented reality (AR) system made possible by the development of a highly-sophisticated and innovative real-time graphics software engine and a sophisticated new underwater environmental sensor. Mobile components of the system will be complimented by a fixed-base data storage and retrieval system designed to accept and assimilate into a common database bathymetric and environmental information acquired from around the world by the mobile SUVS units. SUVS is capable of sensing, modeling and realistically displaying underwater environments in real-time. This technology will foster widespread utilization, and will play an important role in areas of homeland security, commercial and recreational maritime navigation, bathymetric data collection, and environmental analysis. The technology is also readily adaptable and highly desirable in non-marine applications.

The SUVS underwater visualization system is based on two innovations. The first innovation is an advanced terrain rendering graphics software engine capable of acquiring and incorporating large amounts of streaming real-time data into preprocessed terrain maps, and capable of generating geo-spatially-synchronized, highly-detailed, three-dimensional images. This rendering engine is designed to run on a very low-cost hardware platform.

The second innovation is an advanced three-dimensional underwater sensor incorporating time-of-flight (TOF) LIDAR with self-adjusting beam convergence, a SONAR transceiver, a dual-axis scanning platform, and advanced MEMS (micro electro-mechanical systems) attitude sensing elements. This sensor is capable of acquiring high-fidelity data from marine environments in real-time, preprocessing the data, and passing it along to the graphics software engine for display to an operator.

DETAILED DESCRIPTION OF THE PREFERRED EMBODIMENTS

Figure 1:
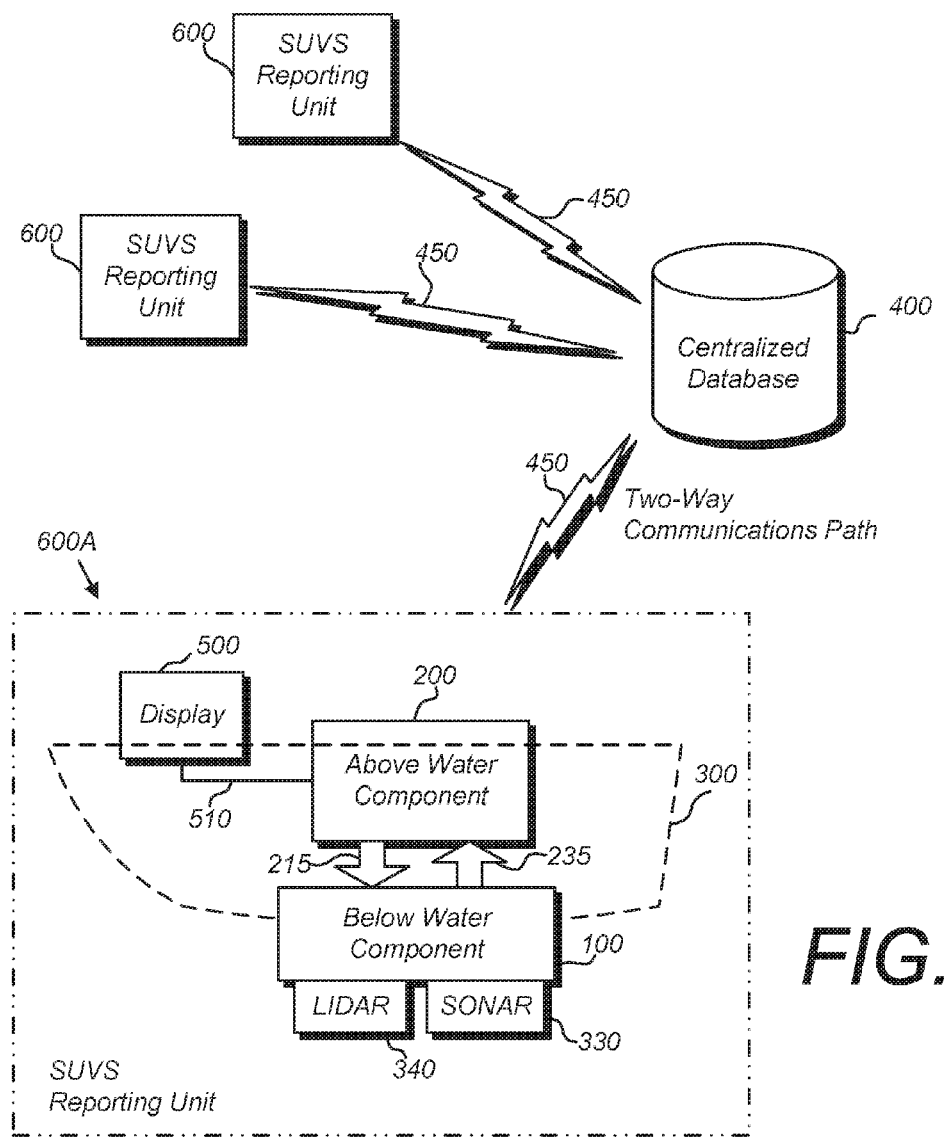
FIG. 1 is a block diagram showing a high-level view of the synthetic underwater visualization system of the present invention.

For the purposes of this specification, the following terms have been defined:
3D Three Dimensional
AI Artificial Intelligence
IG Image Generator
ALB Airborne LIDAR Bathymetry
APD Avalanche Photodiode
API Application Program Interface
AR Augmented Reality
ASIC Applications Specific Integrated Circuit
CPU Central Processing Unit
DARPA Defense Advanced Research Projects Agency
Eutrophic Shallow, warm, mud bottom lakes with high sediment levels and which are high in nutrients
FAA Federal Aviation Administration
FCS Future Combat Systems
GIS Geographic Information Systems
GNSS Global Navigation Satellite System
GPS Global Positioning System
GPU Graphics Processing Unit
IG Image Generator
JALBTCX Joint Airborne LIDAR Bathymetry Technical Center of Expertise
LIDAR Laser Identification Detection and Ranging
LOD Level of Detail
MEMS Micro Electro-Mechanical Systems
MMOG Massively Multi-player On-line Games
Nd:YAG Neodymium—Yttrium Aluminum Garnet (Laser)
OEM Original Equipment Manufacturer
Oligotrophic A newly formed lake that is poorly nourished, with small quantities of nutrients that plants need to grow
PC Personal Computer
PIN PIN Photo Diode
SHOALS Scanning Hydrographic Operational Airborne LIDAR Survey
SONAR Sound Navigation and Ranging
SUVS Synthetic Underwater Visualization System
TAWS Terrain Awareness and Warning
USACE US Army Corps of Engineers
WAAS Wide Area Augmentation System
YAG Yttrium Aluminum Garnet (Laser)
SUVS Operation Overview:

Augmented reality (AR) is a created environment that includes elements of both virtual reality and the real world. A simple example of this is the yellow first-down line that is artificially created and "painted" on top of the field in televised football games. The synthetic underwater visualization system (SUVS) of the present invention combines real-world data, including sensed terrain and underwater objects, with virtual elements, such as predefined library graphics and animations, to create an unparalleled real-time graphic depiction of sensed underwater environments.

The principal components of the SUVS system are an advanced, miniaturized, underwater scanning LIDAR/sonar sensor and a high-resolution display console. SUVS can manipulate existing bathymetric data in real-time, transforming it into a very realistic three-dimensional view of the underwater environment in the immediate vicinity of the system, using information acquired from the advanced sensor system. The operator console displays this image on a daylight-readable, color liquid crystal display or any appropriate display type. The operator is able to view the rendered scene from virtually any "camera" angle, and discern vehicle location and orientation very accurately in relation to the actual environment. The operator's location and position in space are determined by components within the advanced LIDAR sensor, which include an augmented location sensor (such as a global positioning system, or GPS, sensor, or other global navigation satellite system (GNSS) augmented with a supplementary signal from a wide-area augmentation system, or WAAS) and MEMS-based attitude sensors.

SUVS acquires real-time data from a newly-created, innovative, underwater sensor. In one embodiment, this sensor uses LIDAR adapted for use underwater to very rapidly scan the environment by sending out millions of pulses of light in a hemispherical pattern and measuring the light returning to the system. Pulsed sonar is used to acquire additional information, including current depth and the type of the bottom surface soil.

As this high-resolution data is received, the on-board processing unit uses artificial intelligence (AI) algorithms to identify objects based on various sensed attributes. When the objects are identified, SUVS loads graphics elements from a predefined library of known underwater objects and displays these elements with the proper location, size, animation and orientation relative to the environment so as to create a highly realistic image. Terrain information that is acquired by this system that differs significantly from pre-existing bathymetric information will be used to correct information for subsequent use.

The major elements of the present invention (SUVS) are identified in the following paragraphs.

Display Console:

In one embodiment, the Display Console consists of a daylight-readable color display, computing platform, non-volatile storage, and short and long-range wireless transceivers. The short-range transceivers will be used to communicate with the SUVS Sensor (described below), while the long-range transceiver will be used to communicate from vessel to vessel and to access the bathymetric database. In one embodiment of the invention, the display console may be a dedicated, information display designed specifically for use with SUVS. In an alternate embodiment, an existing mobile device, such as an iPad or a smart phone, may be used as the display console. Some embodiments may utilize both a dedicated display and a mobile device in cooperation.

Bathymetric Database:

A database and learning software suite will receive data gathered from all over the United States and/or the world by SUVS-enabled systems and use this data to update existing bathymetric information so that the national and world underwater terrain accuracy increases over time. This data can then be redistributed to deployed SUVS systems and other targeted recipients so that each system gains knowledge from the sum of these inputs. In some embodiments, this bathymetric database may be centralized, hosted on a primary server, while in other embodiments the bathymetric database may be distributed across a cloud-based server. Occasionally, throughout this specification, the term "centralized" will be used to describe the database, and, when it is, the term shall be defined to mean "a server or collection of servers and/or other storage and processing components that are tied together logically to perform a single primary function." That is, whether the database described is located on a single physical server or distributed over various resources in a cloud, the term "centralized" is not meant to limit the physical implementation of the database.

SUVS Sensor:

An innovative, unique, technically-advanced 3D sensor is the heart of the invention, and, in one embodiment, comprises the following individual elements: scanning bathymetric LIDAR, sonar, MEMS attitude sensors, a location sensor (such as a GPS receiver or similar GNSS receiver), and a magneto-resistive flux sensor. The information gathered from these components is combined through a process of sensor fusion to produce a homogeneous output rich in environmental information. This sensor enables the SUVS system to create an augmented reality depiction of terrain detail unattainable in any commercially-available underwater visualization system, and is seen as one of the key technical innovations in the SUVS system.

3D Rendering Augmented Reality Software:

Another key component of the SUVS system is an advanced graphics-rendering engine that operates on sparse data (containing little detail in some locations and rich detail in others) and displays it in three dimensions on the display console. This graphics-rendering engine uses data acquired from the SUVS Sensor to augment preexisting terrain maps in real-time. This software works with large, detailed datasets representing terrains in the range of several hundred thousand square kilometers on a low-cost hardware platform designed to be affordable to most users.

It is only due to relatively recent developments in MEMS technology and advanced laser research that it has become possible to create the SUVS sensor. The overall architecture of the SUVS invention is shown in FIG. 1 and the operational concept in FIG. 2.

Turning now to FIG. 1, we see a high-level diagram of one embodiment of the synthetic underwater visualization system, or SUVS, of the present invention. The main functional component of the full visualization system described herein is the primarily mobile component called the "SUVS reporting unit" 600. A SUVS reporting unit 600 is typically a watercraft equipped with the sensors and other components needed to sense the underwater terrain, flora and fauna, and other objects. However, a SUVS reporting unit 600 may also be a buoy or other floating platform that contains similar sensors, and which has provides the same function. A buoy of floating platform may be positioned in a harbor or near important infrastructure on or near water, tethered or anchored in location to continuously monitor the underwater environment for threats. These types of SUVS reporting units 600 would be largely non-mobile units. For the purposes of discussion in this specification, many of the examples given will describe the embodiment of the SUVS reporting unit 600 based on a mobile watercraft, but the use of this type of example should not be considered limiting to the implementation of the invention.

Looking now at the expanded view of a SUVS reporting unit 600A in FIG. 1, we can see the subcomponents that make up a typical SUVS reporting unit 600. The main components will be mounted to or used in or near a watercraft or other floating platform 300. The floating platform 300 in FIG. 1 is shown as a dashed line for two reasons: (1) to allow the description of the components mounted in or on the floating platform 300, and (2) to emphasize that the floating platform 300 may be a watercraft (as shown) or it may be any other appropriate type of floating platform.

The SUVS system has an above-water component 200 containing electronic circuitry and sensors that do not need to be under or in contact with the water. The details of the above-water component 200 are illustrated in FIG. 4 and the corresponding text description. There is also a below-water component 100, detailed in FIG. 3, containing circuitry for controlling the underwater sensors, including the LIDAR 340, and the sonar 330. The above-water component 200 and the below-water component 100 communicated with each other over communications pathways 215 and 235. Communications pathway 215 is used in this embodiment to bring compass and GNSS values from the above-water component 200 to the below-water component 100. Communications pathway 235 brings data from the below-water component 100 to communications circuitry of the above-water component 200 for transmission to external systems.

It should be noted that, in other, alternate embodiments of the present invention, the above-water component 200 and the below-water component 100 may be combined into a single enclosure, or that the circuits and sensors shown housed in each different component (as shown and detailed in FIGS. 3 and 4) might be divided between the two components (100 and 200) differently than shown in this example embodiment, without deviating from the intent of the present invention.

Finally, the SUVS reporting unit 600 (600A) contains a display 500 for showing the underwater environment as detected by the system sensors and as augmented with additional detail supplied by the system. The display 500 is connected to the above-water component 200 by communications means 510, which may be a wired connection or a wireless connection. The display 500 may be a dedicated, special purpose computer display, or it may be a mobile device such as an iPad, smart phone, a tablet computer, or a laptop, or any other appropriate device with a suitable display.

One or more SUVS reporting units 600 may be deployed in a body of water, or dispersed over different bodies of water. Each SUVS reporting unit 600 connects data, such as bathymetric data and data describing flora, fauna, and other underwater objects, and transmits this data to a centralized database 400. This data is transmitted over a wireless two-way communications path 450, and is processed and assimilated by the centralized database 400 into a global repository. Data contained in the centralized database 400 can be transmitted back to each SUVS reporting unit 600 in the form of updated bathymetric maps and other data.

Figure 2:
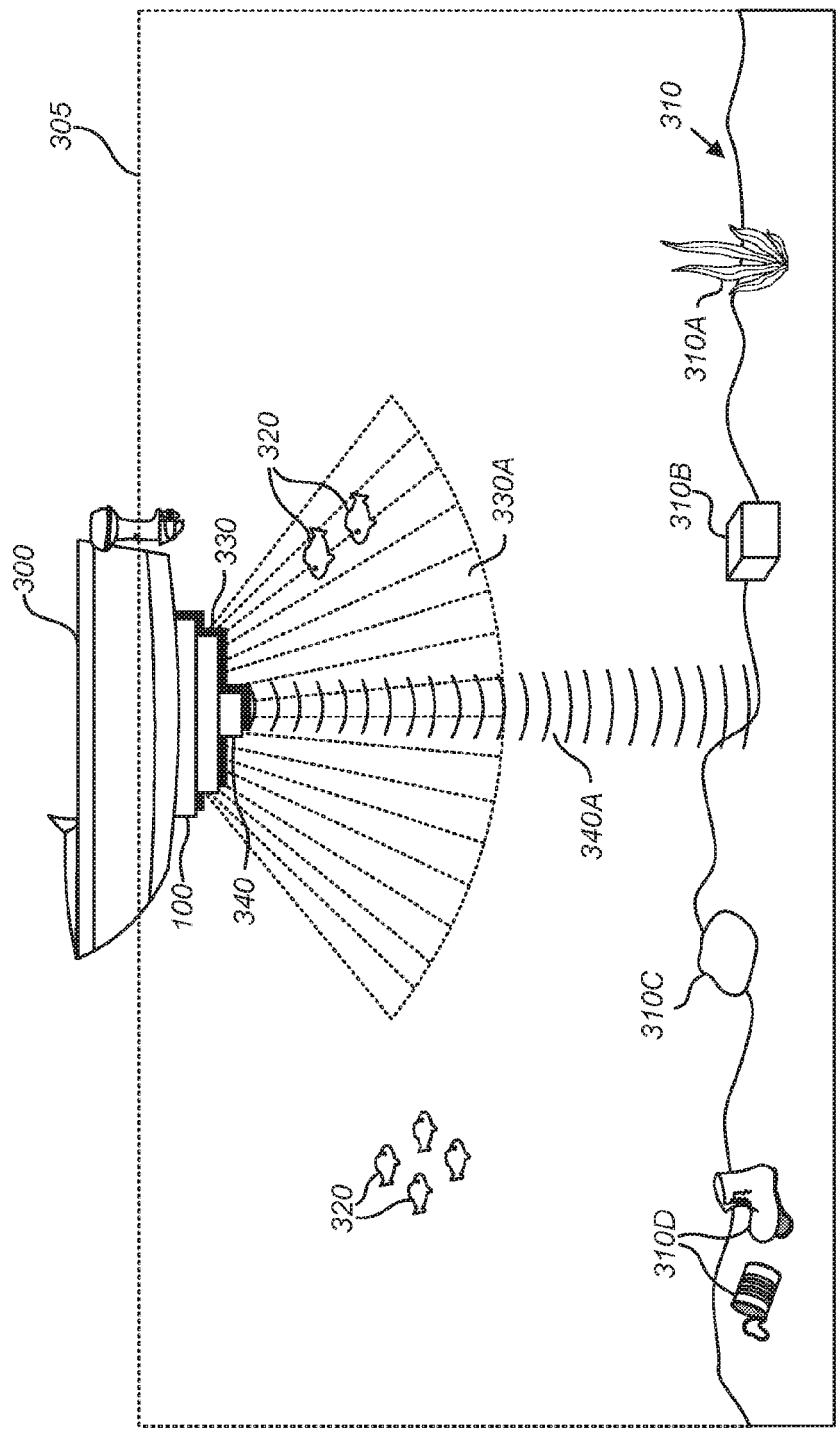
FIG. 2 is an illustration of the synthetic underwater visualization system of the present invention as it might be used in an operational scenario.

FIG. 2 describes the SUVS invention of FIG. 1 in an example operational scenario.

The below-water component 100 is directly mounted to the bottom of a watercraft (or fixed buoy) or other floating platform 300, or, in alternate embodiments, can be connected to the floating platform 300 by a tether and otherwise allowed to be free-floating. A scanning LIDAR system 330 is used to acquire data about the underwater environment 305 immediately surrounding the below-water component 100. The fusion of this information with that from other sensor elements within the SUVS enables the creation of extremely detailed graphic renditions of underwater features, including manmade objects and marine life. Movement of the floating platform 300, such as rocking caused by waves or movement within the floating platform 300, is detected by the SUVS system and can be accounted for in the resulting displayed images in some embodiments of the present invention (that is, the display of the images can be presented such that the moments of the floating platform 300 or of an operator holding the display can be taken out of the visual presentation.)

The sonar component 340 of the SUVS sensor will be used to calculate depth and bottom type. This information will allow for dynamic calibration of the LIDAR sensor 330 so as to assist in compensating for water turbidity, and as a means for the graphics software to determine what bottom type is to be displayed.

The sonar 340 and LIDAR 330 are used in conjunction to create a clear sensory image of the underwater environment 305. The sonar 340 typically uses a relatively focused (narrow) "beam" of sound waves 340A directed at the underwater terrain 310 to aid in the detection of the shape and distance of the terrain 310. The LIDAR 330 is directed in a scanning pattern 330A that is broad (nearly hemispherical) in the area just below and around the floating platform 300 (or just below the LIDAR 330 if the LIDAR is suspended or tethered to the floating platform 300. The scanning pattern 330A of the LIDAR 330 allows the SUVS to acquire detailed images of the area captured within the scanning pattern 330A, while the sonar 340 is used to capture data about the terrain 310 and typically has more range than the LIDAR 330, especially in turbid, murky water. Data from the two sensing systems are combined to create a more complete picture of the surrounding environment 305.

The creation of a lightweight, low power, and affordable bathymetric scanning LIDAR system 330 with capabilities similar to the SHOALS systems is a significant development. In one embodiment, the LIDAR 330 may utilize a solid-state diode pumped laser, emitting light at a wavelength of 532 nanometers (the wavelength that is least attenuated by water). The LIDAR 330 is designed so as to avoid eye injury to marine life and human divers. Because the SUVS LIDAR 330 is mounted underwater, not on an aircraft, and because the target depth for operation is 50 meters or less, the very high-power YAG lasers and expensive photomultiplier tubes used by the SHOALS system will not be required. Rather, the present invention, in one embodiment, uses solid state avalanche photodiodes (APDs) as light detectors.

Returning to FIG. 2, the combined data received from the LIDAR 330 and sonar 340 will be used to detect and track objects within the underwater environment 305 surrounding the floating platform 300. Examples of these objects include marine animals 320, marine plants 310A, objects of unknown origin 310B (for example, a bottom-mounted sea mine, a shipping container, a sunken watercraft, etc.), rocks 310C and other natural outcroppings, and debris 310D. These objects are detected and recognized by the SUVS, and used to compare to previous scans of the area to detect differences that may exist in the data.

Figure 3:
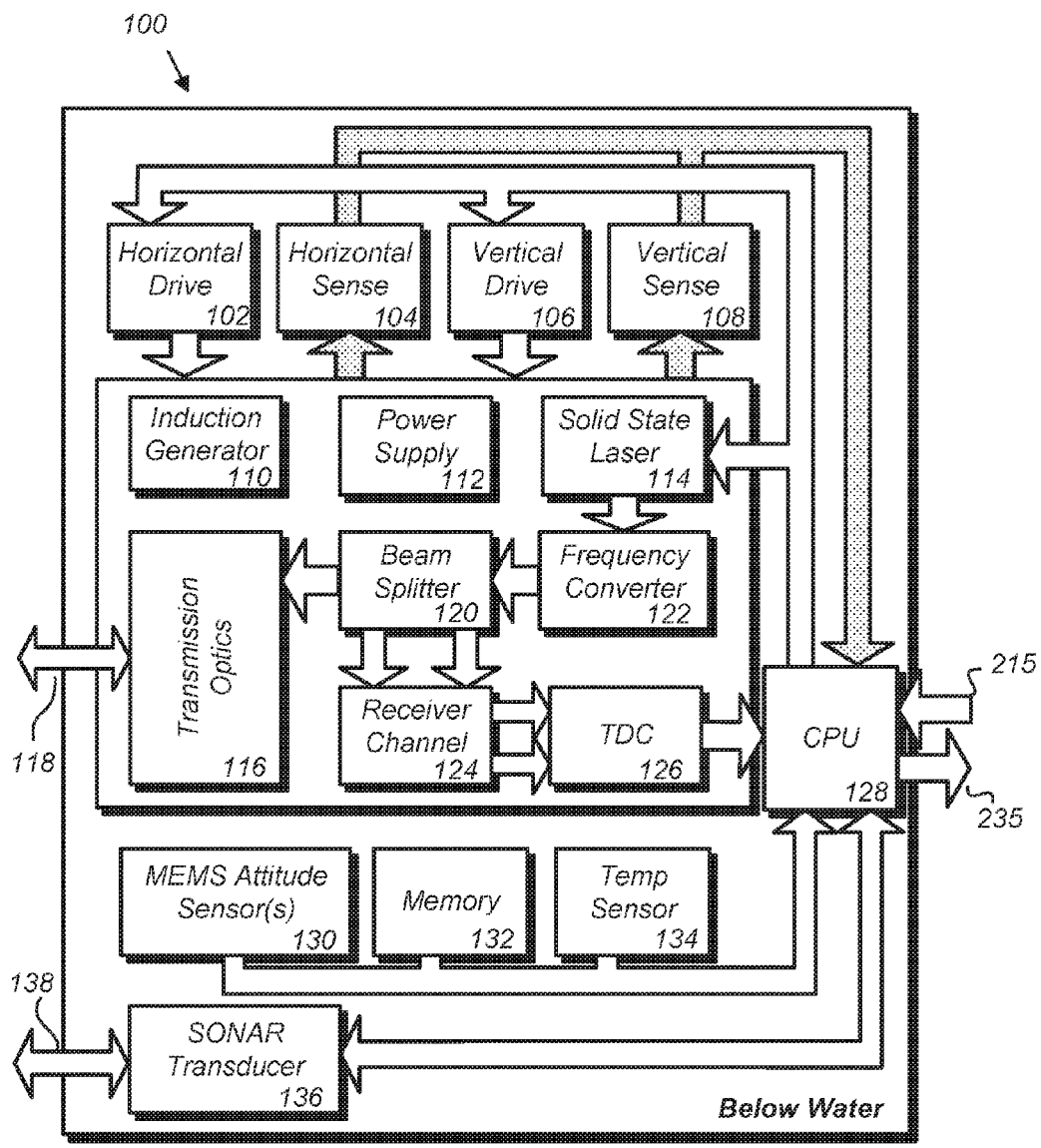
FIG. 3 is a block diagram of one embodiment of an underwater component of the synthetic underwater visualization system of the present invention.
Figure 4:
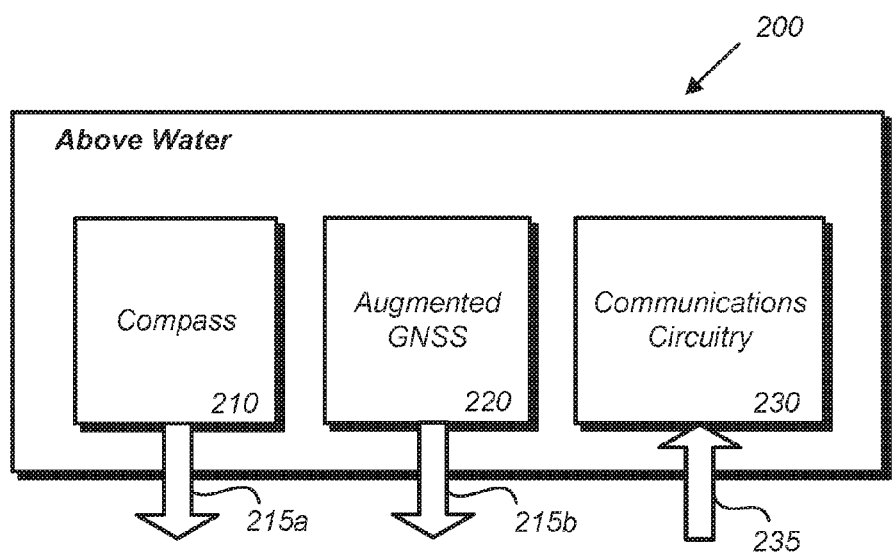
FIG. 4 is a block diagram of one embodiment of an above water component of the synthetic underwater visualization system of the present invention.

FIG. 3 shows a detailed block diagram of one embodiment of the below-water component 100 of the present invention (some references in the following paragraphs also appear on FIG. 2). A CPU (central processing unit) 128 controls the operation of most of the functionality within the below-water component 100. The CPU 128 receives inputs from horizontal sense 104 and vertical sense 108 blocks, with information from the sensing systems (LIDAR 330 and sonar 340). In response, the CPU 128 commands the horizontal drive 102 and vertical drive 106 function blocks to direct the positioning of the LIDAR component 330.

In one embodiment of the SUVS, the control circuitry of the LIDAR component 330 includes an induction generator 110, a power supply 112, a solid state laser 114, a frequency converter 122, a beam splitter 120, and transmission optics 116. This circuitry is used to generate and transmit a laser pulse 118.

Outputs form the beam splitter 120 are also directed into a receiver channel 124 and fed into a time-to-distance converter (TDC) 126. The output from the TDC 126 is fed back into the CPU 128.

The CPU 128 transmits information over an output communications pathway 235 to communications circuitry (230, see FIG. 4) in the above-water component (200, see FIG. 4). The CPU 215 also receives data over an input communications pathway 215 from the compass (210, FIG. 4) and the GNSS receiver (220, FIG. 4).

The below-water component 100 also contains attitude sensors 130, for sensing the geospatial position and orientation of the SUVS, memory 132, and a temperature sensor 134. Finally, the below-water component 100 contains a sonar transducer 136 for creating and sending sonar directives 138 to the sonar component 340.

FIG. 4 details one embodiment of the above-water component 200, including a compass 210, a GNSS receiver 220 (likely augmented by a supplemental system to provide a more accurate location), and communications circuitry 230. The compass 210 provides directional information to other system components over communications pathway 215a and the GNSS receiver 220 provides location information over communications pathway 215b. Pathways 215a and 215b combine to form the input communications pathway 215 as previously shown in FIG. 3 and described in the corresponding text. The communications circuitry 230 receives data from the CPU (128, FIG. 3) over communications pathway 235 (the same 235 as shown on FIG. 3).

The commercialization of the SUVS system will utilize lightweight, low-power, low-cost components throughout the design. In some embodiments of the present invention, major elements of the scanning bathymetric LIDAR 330 may be incorporated into custom ASICs, including the Time to Distance Converter and the precision receiver circuits. Beam steering will be accomplished through the utilization of custom designed low cost mechanical components. The remaining sensor elements may be designed and integrated, along with the scanning LIDAR 330, into a small, ruggedized, lightweight, portable sensor. The principle components of this sensor will be reconfigurable for use in free air applications such as aviation and land vehicles.

Terrain Rendering:

In coastal marine navigation, the SUVS system is required to render very large terrain areas. Data for these types of terrains is most commonly stored today using heightmaps, a method of storing terrain data in which data is stored using a fixed-resolution grid. Using heightmaps, a terrain with one elevation point every 300 millimeters using 2 bytes of data each would require approximately 22 megabytes of data per square kilometer. A typical terrain in the range of several hundred thousand square kilometers, say 800 by 800 kilometers (640,000 square kilometers), would require in excess of 14,000 gigabytes using heightmaps. Current technology does not allow this amount of data to be effectively stored and rendered on a low-cost hardware platform, and since the SUVS system will be required to work with terrain areas of this magnitude, some method other than traditional heightmaps must be developed for representing large terrains.

To address this problem, one embodiment of the present invention uses a revolutionary new software concept whereby the terrain is represented by a sparse dataset. The system allows for the storage of large amounts of data in areas of high detail where it is needed and minimal data in areas of low detail, such as flat ground, where it is not. A sparse dataset allows for a more efficient method of modifying and adding detail when new terrain information is acquired via the SUVS sensor. Without the fixed resolution and size of a heightmap, detail can be added as needed to areas as new information arrives. This sparse dataset will be stored with regional and detail indexes, allowing terrain data to be quickly accessed by the terrain-rendering engine.

The rendering of large, sparse data on low-cost hardware requires the use of "level of detail" (LOD) software algorithms (explained in further detail later in this specification) in order to reduce the number of vertices/triangles rendered. Applying dynamic LOD will result in the need to create dynamically changing Triangular Irregular Networks (TINs). The processes of creating these TINs (vertex LOD and TIN building) are slow and additive (cannot be done in parallel), which can result in a low rendering frame rate. Further compounding the problem is that today's LOD algorithms work with traditional heightmaps, and are not designed to work for sparse data. Consequently, the present invention uses unique LOD and TIN building algorithms to achieve the objectives for the SUVS system.

To address these issues, the present invention advances the state-of-the-art of graphics rendering software in the following ways:

New LOD algorithms for large sparse datasets. These algorithms previously existed for height map data, but not for large sparse datasets.

A new TIN building algorithm based on the well-known Delauney algorithm capable of executing at a much higher speed than current implementations.

The use of bump mapping texturing techniques to add high frequency detail, giving the terrain a realistic look without adding additional detail to the underlying terrain.

A vertex and triangle caching mechanism, such that the vertex LOD algorithm sends only new and to-be-removed vertices to the TIN builder. Therefore the TIN builder only needs to add and remove triangles from a cached TIN.

All of the functions required to render the terrain, such as operating system eccentricities, file input/output, LOD algorithms, TIN building, object loading and rendering, caching, operator input, and real-time sensor input make for a potentially unpredictable system, which results in unpredictable frame rates. In one embodiment of the invention, a supervisory algorithm is used to monitor and adjust system performance so as to accommodate processing time surges between frames and smooth out system performance.

Storage of surface texture information can also be very memory intensive. Unfortunately, representing textures as sparse sets of data, the same concept proposed for addressing the heightmap issue, cannot be used with surface texture information. This is due to limitations in graphics application program interfaces (APIs), which require that surface textures have detail that meets or exceeds the detail of the underlying terrain surface if they are to look good. The present invention solves this problem by loading tiles of very low detail texture across large areas of the terrain, swapping out tiles as needed as operator perspective changes. High-detail textures are loaded at the locations perceived to be close to the operator, then swapped out with low-detail textures as the operator's view travels across the terrain. In one embodiment of the present invention, the algorithms required to accomplish this are based on the SOAR algorithm for rendering large scale terrains, but applied to textures rather than terrain height maps.

Figure 5:
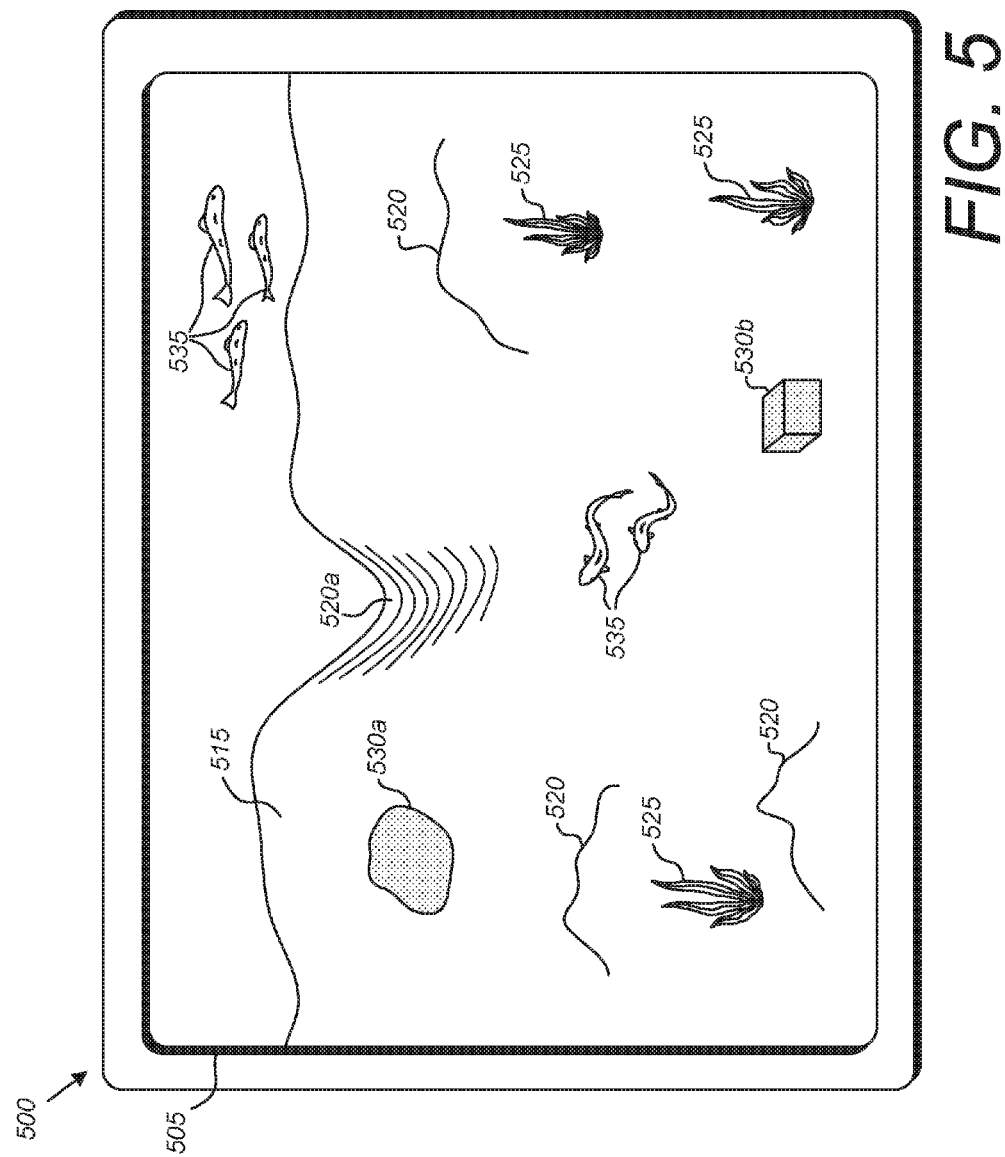
FIG. 5 illustrates one embodiment of a display featuring a graphical visualization of an underwater environment, augmented with expert knowledge by the present invention.

FIG. 5 provides an example of one embodiment of the display module 500 of the SUVS invention. The display module 500 has a display screen 505 for presenting information to the operator of the system. An example of the types of information that might be shown is provided. A three-dimensional depiction of the terrain 515 surrounding the SUVS is displayed. The terrain depiction 515 is displayed in accurate virtual detail, including features such as terrain outcroppings 520, trenches or gullies 520a, rocks and other natural formations 530a, and unknown objects 530b. As shown in FIG. 5, newly discovered features (such as the rock 530a or unknown object 530b) which did not show up on a previous scan of the terrain may be shown highlighted or in a different color to indicate to the operator that the features were previously undetected. In addition to terrain features, the screen 505 may show plant life 525 and animal life 535 and their current position in the water relative to the SUVS.

In one embodiment of the SUVS, the SUVS software will contain animation models of typical marine plant and animal life that can be displayed to represent detected plants and animals. For example, if something is detected by the SUVS that matches the qualities of a typical plant such as kelp, an animated graphical representation of kelp, previously loaded into the SUVS, can be displayed on the screen 505, so that the image of kelp moving back and forth in the water can be shown to the operator, creating a more realistic visualization of the underwater environment. The animated graphic can be sized accordingly such that it is the size and rough shape of the detected plant as sensed by the SUVS. Additional detail on this concept is provided below in the discussion of terrain rendering.

The display module 500 may be a custom display created specifically for the SUVS application, or it may be an existing or off-the-shelf display. In some embodiments, a mobile device, such as an iPad, table computer, laptop computer, or a smart phone may be used as the display module 500.

The present invention is novel and non-obvious in that it addresses several technical barriers that have previously not been addressed by solutions in the prior art. Table 1 below summarizes these technical barriers, and how they are addressed by the present invention.

TABLE 1

Technical Barriers Addressed by Present Invention

| Technical Barrier | New Technology |
|---|---|
| Today's bathymetric scanning LIDAR systems are too heavy, consume too much power, are too fragile, are too complicated to operate, and are too expensive for wide spread commercial use | One embodiment of the present invention uses a new ruggedized, complex scanning LIDAR sensor combining an ASIC laser, attitude and geospatial sensors, and traditional SONAR, the outputs of which are fused and acted upon by sophisticated advanced artificial intelligence software in order to provide a compact data rich stream of information describing the underwater 3D environment |
| Light attenuates quickly in turbid water, limiting the usefulness of optical marine sensing systems | One embodiment of the present invention will use monochromatic 532 nm radiation from a frequency doubled solid state laser, a dynamically focused beam, a very short pulse high power transmitter and an ultra high sensitivity receiver will extend imaging capabilities over any existing prior art systems |
| Time required to perform the millions of scans necessary to generate a detailed LIDAR image prohibits real-time commercial utilization | One embodiment of the present invention generates real-time data from incoming sensor information and uses it to augment pre-existing bathymetric data, rather than attempting to create entire new scenes from incoming data alone. Software are dynamically adjusted so that the scans required are optimized for vehicle speed and detail of image generation |
| Current low-cost mobile hardware platforms are incapable of rendering large 3D terrains while simultaneously processing complex, incoming sensor data in real-time | One embodiment of the present invention uses an innovative sparse dataset based terrain rendering engine using new LOD algorithms, an innovative new TIN building process, and bump mapping texturing techniques that add high frequency detail, giving the terrain a realistic look without adding additional detail to the underlying terrain |
| Lack of algorithms and sensors for detecting and identifying underwater objects in real-time, including terrain features | One embodiment of the present invention utilizes fuzzy logic algorithms based on unique signature characteristics of the SUVS sensors that enables the identification of classes of objects and the intuiting of other classes |

There are many key design factors that must be considered in order to create a commercial version of the present invention. Table 2 below identifies these factors by the SUVS component with which each one is associated, and lists suggested technical "targets" as well as proposed commercial requirements required for a commercially successful SUVS as described herein.

TABLE 2

Key Factors/Technical Targets Chart

| SUVS Component | Key Factors (Variables) | Technical Targets | Commercial Requirement | Prior Art Practice |
|---|---|---|---|---|
| Scanning LIDAR: Collection Optics | Light collection ability | 360 degrees horizontal, 90 degrees vertical | 180 degrees horizontal, 90 degrees vertical | None |
| Scanning LIDAR: Solid State Laser | Pulse width and energy | 1 nanosecond pulse, 100 watts, eye-safe final output | 5 nanoseconds, 40 watts, eye-safe final output | 10 nanoseconds, 30 watts |
| Scanning LIDAR: Imaging range | Attenuation of Light in Water | 7 optical attenuation lengths | 5 optical attenuation lengths | 4 optical attenuation lengths |
| Sensor Fusion: Gathering and Correlating Data | Accurate, real-time acquisition and calculations on multiple data points | 32,400 results per second | 16,200 results per second | None |
| Rendering 3D Model: Performance when rendering High-Detail terrain | Frame rate | 60 frames per second on low-cost mobile hardware | 30 frames per second on low-cost mobile hardware | Currently not done on low-cost mobile hardware |
| Rendering 3D Model: Performance when rendering High-Detail terrain | Frame Budget | 16 milliseconds per frame for 3D graphics calculations on mobile hardware | 33 milliseconds per frame for 3D graphics calculations on mobile hardware | None |
| Rendering 3D Model: High-Detail Terrains in a Space- | Dataset Size | 90% reduction in data storage while maintaining select areas of high detail | 75% reduction in data storage while maintaining select areas of high detail | Utilize large terrain databases on high-cost platforms |

TABLE 2-continued

Key Factors/Technical Targets Chart

| SUVS Component | Key Factors (Variables) | Technical Targets | Commercial Requirement | Prior Art Practice |
|---|---|---|---|---|
| Constrained Environment Real-time ID of Objects: Object Detection | Percent detection of objects in 360 degree by 80 degree space | 97% of suspended objects, 10% of predefined objects on the bottom | 95% of suspended objects, 5% of predefined objects on the bottom | SONAR can detect 95% of suspended objects in narrow-beam cone in direction of focus |
| Real-time ID of Objects: Object Identification | Percent identification of predefined objects in real-time | 95% of predefined objects over 50 mm properly identified | 50% of objects over 50 mm properly identified | SONAR which gives one return echo for entire beam footprint |
| Real-time ID of Objects: Detection of new objects on pre-known terrain | Percent detection of new objects on pre-known terrain | 99% of new objects | 95% of new objects | None |
| Create a Learning System: Learning Distributed GIS System | Accuracy in identification of valid new environmental data | Eliminates 100% of invalid data and incorporate 100% of new valid data | Eliminates 95% of invalid data and incorporate 95% of new valid data | Manual collection and correction of existing data |

A successful SUVS system will directly and dramatically impact the knowledge base and technical leverage of the world in several ways. Because of the profound low-cost, the technical capabilities of the envisioned system, and the fact that data acquired from all systems will be combined into a single database or other appropriate centralized repository, the world will gain unparalleled knowledge of underwater environments such as lakes, rivers, and coastlines. This knowledge will be a significant step forward for maritime navigation and the generation of bathymetric data. In addition, the ability of the system to detect, identify, and store information on all types of marine plant and animal life, as well as water clarity, will add significantly to our understanding of marine biology. The information gathered and integrated by the deployed net of SUVS systems will create a dynamic database of marine life locations and migration habits and the early detection of pollution. The Coast Guard and other marine authorities will have instantaneous access to up-to-date data on the location of all underwater objects approaching our coastlines.

The following paragraphs provide additional information on one embodiment of the SUVS invention, and specifically on the optical characteristics required for the invention to work efficiently.

In one embodiment, SUVS will inject the beam and collect the reflected light using optics immersed in the water. The optics, light pipes, fibers, and antireflective coatings can be selected to maximize the percentage of the pulse energy to be delivered into the water.

Clear water does not have a strong absorption coefficient for green light. Use of 532 nm radiation from a doubled Nd:YAG laser keeps absorption by water to a minimum. Absorption by suspended material or living organisms is also a concern. However, most photosynthetic processes utilize visible light in the red and blue regions of the spectrum. Again, use of 532 nm radiation will minimize any absorption by these processes. While absorption does attenuate the number of photons reaching the detector, it does not disturb the illumination profile of the beam and therefore does decrease the target depth resolution.

The scattering of the probe pulse is the most challenging problem to overcome. Scattering has the effect of spreading the incident beam, which will cause a target area larger than is desired to be illuminated. The reflected light is also scattered on the return trip to the collection optics. Overall the effect of scattering will be to reduce the number of photons/unit time collected by the acquisition system. An additional affect will be the "blurring" of the target point, such that a larger area will be probed than desired, and the intensity of the leading edge of the return beam is attenuated, which potentially leads to loss of temporal resolution and thus depth resolution. The loss of spatial resolution is mitigated by using a focusing system on the collection optics to limit the viewed area. The size of the aperture can be adjusted to increase or decrease the resolution. The problem of the loss of temporal resolution is mitigated by using very short pulse widths. If the pulse width is limited to 1 nanosecond, for example, the entire return pulse can be collected to increase the possibility of detection, while only limiting the depth resolution to 250 millimeters.

The presence of scattering particles in the water causes constant background radiation as well, which needs to be filtered out. This is done, in one embodiment, by gating the collection response. The use of dichroic notch filters allows the system to collect a very small spectral range around the source wavelength. This technique is successfully used on existing LIDAR systems to allow operation during daylight hours.

The collection optics are used to define the field of view necessary for various applications. In a survey mode, optics with spherical/fisheye type collection optics will allow good signal return strength at the expense of spatial and depth resolution. However, in "imaging" mode, the field of view can be limited to a small portion of the illuminated spot size on the target. By using the signal collected from multiple pulses, the fine resolution necessary for target recognition can be realized. Even with a pulse rate of 200 Hz, 50 to 60 pulses can be incident on the target before the movement of the collection system becomes an issue.

The following paragraphs provide additional information on one embodiment of the SUVS invention, and specifically on the efficient display of 3D virtual environments.

The concept of rendering large-scale detailed terrain databases at an acceptable rate is possible today on large image generators (IG) commonly used by military simulators. These systems rely on memory-intensive heightmaps where every area of terrain has the exact same amount of detail, whether it is required or not. However, years of research on sparse datasets and graphic rendering concepts have shown that high-detail results can be produced on a low-cost mobile processor platform. Handheld low-memory GNSS units rely on a similar sparse terrain data concept to produce acceptable results on a low-cost platform, by displaying only the detail required for the application.

The landscapes displayed by the SUVS system will need to be modified (deformed) based on the introduction of new terrain data from the SUVS sensor. For instance, sandbars are constantly reforming on river bottoms due to changes in currents and river traffic. When the SUVS sensor detects a new sandbar beneath the vessel, the terrain must be modified in real-time to provide up-to-date river bottom images to the operator. This real-time requirement adds a new level of complexity to the 3D rendering algorithms.

Not only must the SUVS be able to accurately display terrain maps and detect underwater objects, but it is also required to augment this data with unique textures and graphics. For example, if the SUVS sensor detects a moving target that it determines matches the specifications of a walleye, it will call up the image of a walleye from a predefined graphics library, size the graphic accordingly, and display it in the location of the detected object. In addition to a graphical image of the walleye, the SUVS system has the option of displaying an animated image sequence of the walleye (in this example), such as a pre-recorded animation of a walleye swimming, or even an "intelligent" and interactive animation of a walleye that responds to stimuli, such as new information received from the sensors (the presence of other fish, or of an object) or an interaction with the human operator (perhaps through a touch screen interface).

Figure 6:
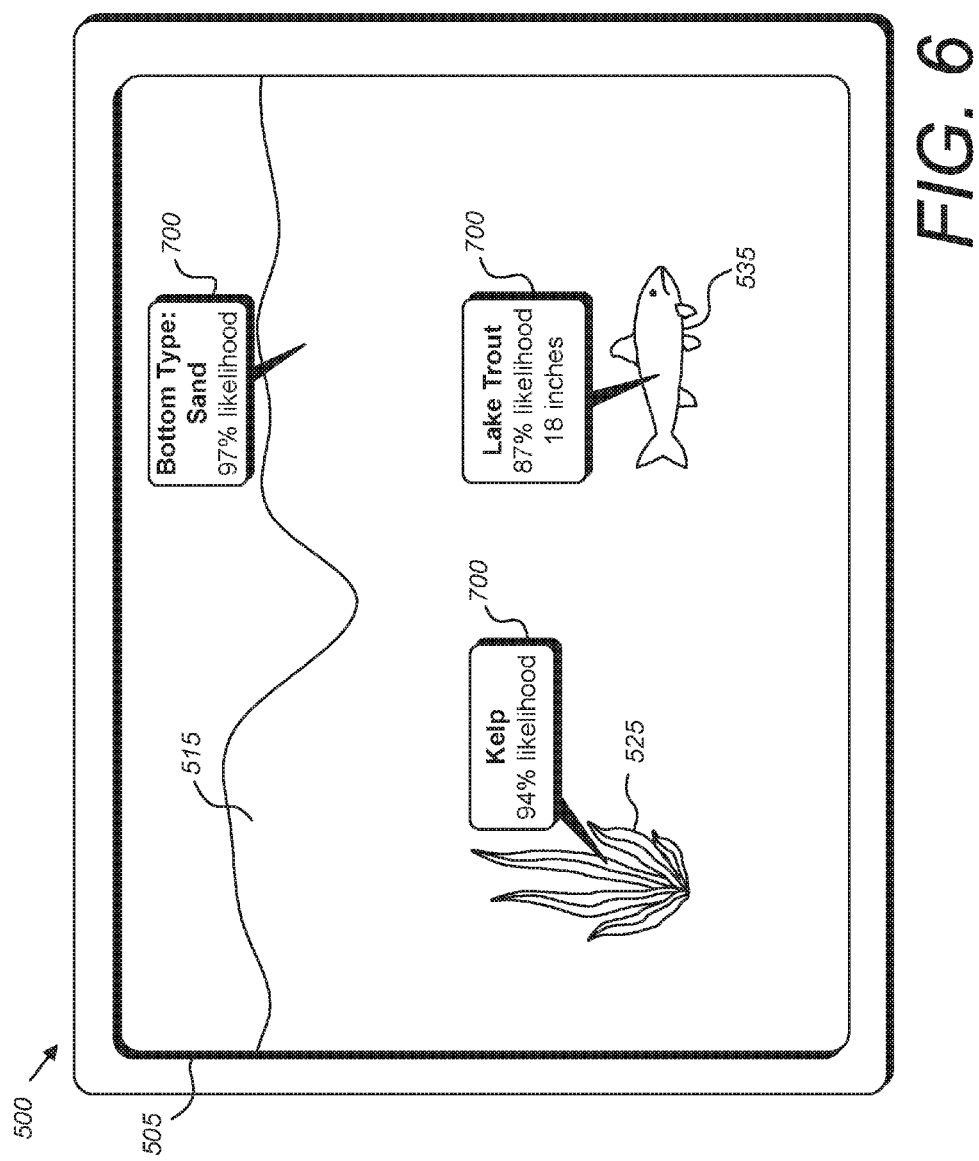
FIG. 6 illustrates how information tags can be added to a displayed object on the present invention to provide additional information about each detected object.

These animated sequences would act essentially as avatars for the object they are representing, and could be loaded with additional information that could be called up through an interaction with the display. Turning now to FIG. 6, we see an example of one embodiment of the display module 500 and display screen 505 as previously presented in FIG. 5. In this version, though, information tags 700 containing information about the various objects being displayed are shown. These information tags 700 may be displayed all the time, perhaps selected through a customization interface on the display screen 505, or in other embodiments maybe the information tags 700 appear when an operator interacts with the corresponding object (for example, a tag 700 describing a fish may appear attached to the fish when the user taps the fish graphic). In FIG. 6, examples of information tags 700 are shown. The terrain 515 is marked with an information tag 700 identifying the type of the bottom surface of the body of water, as well as with a percentage of likelihood that the information is correct. The type of bottom surface can usually be determined by analyzing the return echo from a sonar pulse, as different types of bottom surface (clay, sand, mud, etc.) will give different return types.

The animal life 535 shown in FIG. 6 is marked with an information tag 700 identifying the most likely type of animal (in this example, a lake trout) with a percent likelihood of correct identification and an approximate length of the fish. It is possible to identify the likely type of fish based on an algorithm which considers the geographic location of the lake, the depth that the fish is in the body of water, the time of day, the size of the target, and the overall shape of the target. Other factors may also be included, such as a unique swimming or movement signature. For instance, if it is known that a body of water has been known to have a lot of trout and a lot of sunfish, it might be relatively easy to identify the type of fish by looking at the size and shape of the return echo and comparing that to the available types of fish known to be in that body of water. The more identifying factors available in the return signature from LIDAR and/or sonar, the higher the probability that the identification is correct.

Finally, FIG. 6 shows a piece of plant life 525 being marked with an information tag 700 identifying the most likely type of plant life (kelp, in this example) and the percent likelihood of correct identification. Similar methods to those described in the previous paragraph for identifying animal life 535 may be used to identify plant life 525.

A database of underwater terrain information discovered by a network of deployed SUVS systems. New information will be gathered constantly from the deployed systems and uploaded to this central database. Existing maps will be integrated with the updated information, and redeployed to units in the field.

Business Opportunity:

The commercial opportunities for accurate, real-time, underwater visualization systems that can both contribute and draw upon the collective information gathered by all systems will grow to immense proportions as the technology to enable such collaboration is developed and deployed and the cost of such systems are reduced. In the same way that having many phones adds value to a single phone, having many "learning" navigation systems deployed and sharing the results among each other will result in an unprecedented level of detailed knowledge and understanding of underwater environments and their inhabitants, and a new and dynamic source of intelligence. This new information, coupled with next-generation real-time sensors and cutting-edge visualization, will add substantial value to the economy by reducing threats to national security through the early detection and identification of water-borne threats. In addition, navigational safety will be enhanced, helping to reduce the number of accidents which occur each year that result in injury, financial loss, and/or substantial environmental impact. Finally, this technology will provide a demonstrated basis for numerous spin-off commercial, consumer, and military product applications in low-cost, lightweight navigation and visualization products.

Future Users of the Technology:

While the underwater environment is the initial and most obvious application for the SUVS, there are numerous non-marine applications in adjacent industries. For example, in aviation a great deal of effort is being put into creating realistic 3D visualization systems as a result of the FAA's Terrain Awareness and Warning (TAWS) mandate. These "synthetic vision" systems, as they are sometimes called, are starting to be available but cost tens of thousands of dollars and so are far from reaching broad distribution. A synthetic vision system based on the SUVS technology would be an order of magnitude less expensive, and, as a consequence, achieve wide distribution in the general aviation community resulting in safer skies.

This system could fill an important role in the United State's plans for the military for the future by providing a robust low-cost navigation aid for terrestrial, air, or underwater vehicles. It would be applicable to the Navy's Autonomous Underwater Vehicle Program, the Air Force's Unmanned Aerial Vehicle Program, and the Army's Future Combat Systems Program. Currently the United States is spending millions of dollars each year on DARPA and SBIR programs exploring these areas. Rapid commercialization of this system could potentially save millions of dollars and accelerate new vehicle introduction.

Economic Significance of the Invention:

The United States is a highly mobile society and relies heavily on navigational aids to keep waterways, airways, and highways open and safe during all types of weather. These systems are far from perfect and transportation is often disrupted, resulting in an overall slowing of our economic engines. Significant advancements in navigational technologies, such as SUVS, will have a positive impact on the reliability of public transportation.

As fundamental advancements of broad-based technologies overcome key barriers the ripple effect in products and industry is hard to predict. What is known, however, is that affordable high-definition sensors are lacking for marine and non-marine applications alike while the applications for them in navigation, security, remote sensing, and information gathering are endless.

Additional Benefits:

The data acquired by networked systems will aid in better understanding and management of the sensitive ecosystems of our lakes, rivers, and coastal marine areas. Parameters effecting marine life could be dynamically monitored and early action taken where needed in order to better preserve and enhance this fragile ecosystem.

Having described the preferred embodiment, it will become apparent that various modifications can be made without departing from the scope of the invention as defined in this document. For example, and as previously mentioned, the above-water and below-water components described in FIGS. 1-4 might be combined into a single component, or the contents and functions of each component may be redistributed from one to the other component. Also, additional features may be added to the SUVS sensor, or some functional blocks left off, without changing the overall inventive concept.

One embodiment of the system may rely on sonar data only, without the addition of LIDAR, or on LIDAR only, without the use of sonar. A low-cost version of the system may use the more standard sonar technology by itself (that is, without LIDAR) to sense the position and shape of the underwater terrain, as well as the bottom surface type.

Finally, it should be noted that the SUVS sensor can be used to create a bathymetric map of the area immediately surrounding the watercraft in real time, even if no pre-existing bathymetric data exists or has been preloaded into the system. The processor within the sensor can process the sonar and/or LIDAR data in real time to create a visualization of the underwater terrain and environment, including animal and plant life and other transient objects.

LIDAR BIBLIOGRAPHY

1. Kilpelä, Ari, "Pulsed Time-Of-Flight Laser Range Finder Techniques For Fast, High Precision Measurement Applications," Department of Electrical and Information Engineering, University of Oulu, Oulu, Finland.
2. Palojärvi, Pasi, Kari Määttä, and Juha Kostamovaara "Pulsed Time-of-Flight Laser Radar Module with Millimeter-Level Accuracy Using Full Custom Receiver and TDC ASICs," IEEE Transactions On Instrumentation And Measurement, Vol. 51, No. 5, October 2002
3. Arst, Helgi, Vladimir I. Haltrin, and Robert A. Arnone, "Informative Water Layer, Determined by Attenuation Depth, in Water Bodies of Different Turbidity," OCEANS 2002 MTS-IEEE Proceedings, vol. 4.
4. Nyland, Lars S., "Capturing Dense Environmental Range Information with a Panning, Scanning Laser Rangefinder," University of North Carolina, Chapel Hill, http://www.cs.unc.edu/~ibr/projects/rangefinder/how_it_works/.
5. US Army Environmental Hygiene Agency, Aberdeen Proving Ground, Maryland SHOALS Public Laser Safety, Eye Safety Probability Calculations, Oct. 16, 1991
6. Feygels, Viktor I.; Wright, C. Wayne; Kopilevich, Yuri I.; Surkov, Alexey I. "Narrow-field-of-view bathymetrical lidar: theory and field test': EG&G Technical Services, Inc. (USA); St. Petersburg Institute of Fine Mechanics and Optics (Russia).
7. Selected references: Oceanic Lidar, Beam Propagation, Underwater Imaging; Carl Von Ossietzky, Universitat Oldenburg, Institute of Physics; http://las.physik.uni-oldenbutg.de/publications/lidar.html
8. "Underwater 3D imaging technique identifies bottom mines"; An interview with Anthony Gleckler, Senior Systems Engineer; Arete Associates; Sherman Oaks, Calif.; http://www.spie.org/app/Publications/magazines/oerarchive/march/ . . . .
9. Gleckler, Anthony; Griffis, Andrew; Plath, Jeffrey; Sitter, David; O'Brien, Sarah; Schibley, Elisabeth; "Streak Tube Imaging Lidar for Elextro-Optic Identification" Arete Associates, Tucson, Ariz.
10. Philpot, W. D., "CEE 610/SCAS 660 LIDAR Systems" Fundamentals of Remote Sensing," Cornell University, November 2003.
11. Irish, Jennifer L. 'An Introduction to Coastal Zone Mapping With Airborne LIDAR: The SHOALS System"; US Army Engineer Research and Development Center, Coastal and Hydraulics Laboratory. Joint Airborne Lidar Bathymetry Technical Center of Expertise, Mobile, Ala.
12. Final Report Supplement, FY 01; "Using SHOALS LIDAR System to Detect Bottom Material Change"; W. D. Philpot and C.-K. Wang, Cornell University, December 2002.
13. Vaughan, Prof. G.; Wareing, Mr. D.; Norton, Miss E.; Cook, Mr. C.; "Atmospheric Physics: LIDAR"; Aberystwyth, The University of Wales; Department of Physics, Copyright 2000; http://users.aber.ac.uk/ozone/lidar.html.
14. Puget Sound LIDAR Consortium; http://duff.geology-.washington.edu/data/raster/lidar/About_LIDAR.htm
15. LIDARTalk; NIIRS10 Announces the Intelligent Digital Elevation Modeling System; International LIDAR Mapping Forum (ILMF); Orlando, Fla.; February, 2004. http://www.lidarcentral.com
16. International LIDAR Mapping Forum; Aspects, News and Views from NIIRS10, Madison, Ala., Spring 2004.
17. Gilbert, Gary D., Space and Naval Warfare Systems Ctr., San Diego and DeWeert, Michael James, Science and Technology International, Inc. "SC586 When Sonar Isn't Enough: Marine Optics for Port Security". Optics and Photonics in Global Homeland Security, Washington, D.C., December 2003

SOFTWARE/TERRAIN VISUALIZATION BIBLIOGRAPHY

18. Andras, B. (2003). "Real-Time Visualization of Detailed Terrain".
19. Duchaineau, M., M. Wolinsky, D. E. Sigeti, M. C. Miller, C. Aldrich, M. B. Mineev-Weinstein. (1997). "ROAMing Terrain: Real-time Optimally Adapting Meshes". Visualization '97.
20. Hoppe, H. (1998). "Smooth View-Dependent Level-of-Detail Control and its Application to Terrain Rendering". Visualization '98.
21. Hoppe, H., F. Losasso, S. Schaefer, J. Warren. "Smooth geometry images." Eurographics Symposium on Geometry Processing 2003, pages 138-145.
22. Garland, M. and P. Heckbert (1995). "Fast Polygonal Approximation of Terrains and Height Fields". Technical Report CMU-CS-95-181, School of Computer Science, Carnegie Mellon University, Pittsburgh, Pa.
23. Garland, M. and P. Heckbert (1997). "Surface Simplification Using Quadric Error Metrics". SIGGRAPH 97.
24. Larsen, B., N. Christensen. "Real-time Terrain Rendering using Smooth Hardware Optimized Level of Detail".
25. Lindstrom, P., D. Koller, W. RiSUVSky, L. F. Hodges, N. Faust, and G. Turner. (1996). "Real-Time, Continuous Level of Detail Rendering of Height Fields". SIGGRAPH 96, New Orleans, La., ACM SIGGRAPH.
26. Lindstrom, P. and V. Pascucci. "Terrain Simplification Simplified: A General Framework for View-Dependent Out-of-Core Visualization". IEEE Transactions on Visualization and Computer Graphics.

27. Lindstrom, P. and V. Pascucci (2001). "Visualization of Large Terrains Made Easy". Visualization 2001.
28. Luebke, D. and C. Erikson (1997). "View-Dependent Simplification of Arbitrary Polygonal Environments". SIGGRAPH 97.
29. Luebke, D., M. Reddy, J. D. Cohen, A. Varshney, B. Watson, and R. Huebner. (2003). Level of Detail for 3D Graphics.
30. Thatcher, U. "Continuous LOD Terrain Meshing Using Adaptive Quadtrees".
31. Youbing, Z., Z. Ji, et al. (2001). "A Fast Algorithm for Large Scale Terrain Walkthrough". CAD/Graphics 2001.

The invention claimed is:

1. A synthetic underwater visualization system, comprising:
   a floating platform;
   a first environmental sensor comprising sonar subcomponents, wherein the first environmental sensor is attached to the floating platform;
   said sonar subcomponents including a display configured for displaying images representative of subsurface objects detected by the sonar subcomponents;
   at least one additional environmental sensor;
   a processor, wherein said processor is configured to operate and receive data from the sonar subcomponents, and to create a synthetic visualization of the water environment for presentation on the display;
   a plurality of Laser Identification Detection and Ranging (LIDAR) subcomponents, wherein said LIDAR subcomponents are attached to the floating platform;
   wherein said processor is further configured to operate and receive data from the LIDAR subcomponents;
   a database located remotely from the floating platform;
   a plurality of wireless communication subcomponents, wherein the wireless communication subcomponents are configured to allow the synthetic underwater visualization system to transmit environmental data received by and created from the sonar and said additional environmental sensor to the database for storage and assimilation, and to receive information from the database in the form of bathymetric maps updated with the data transmitted by the synthetic underwater visualization system;
   one or more additional remotely-located synthetic underwater visualization systems, wherein the additional remotely-located synthetic underwater visualization systems transmit environmental data to the database, wherein the database stores and assimilates the environmental data from the first synthetic underwater visualization system and the additional remotely-located synthetic underwater visualization systems into a common data set, and wherein the database transmits bathymetric maps that have been updated with the data transmitted by the first synthetic underwater visualization system and the additional remotely-located synthetic underwater visualization systems back to the first synthetic underwater visualization system and the additional remotely-located synthetic underwater visualization systems;
   said system including multiple, pre-programmed animated and interactive sequences of marine life stored in said processor, wherein said processor configured for providing an output consisting of said animated and interactive sequences of said marine life resulting from detection of said marine life by a respective additional synthetic underwater visualization system;
   wherein said system is configured for locating and tracking said detected marine life using GNSS-defined positions and compass headings;
   said system output including an interactive touch-screen display and wherein said system output is configured for displaying data associated with said detected marine life in response to operator interaction with said touch-screen display; and
   said system including an interactive function, wherein said interactive function is configured for affecting said marine life animated and interactive sequences in response to additional underwater stimuli detected by said additional synthetic underwater visualization system.

2. The synthetic underwater visualization system of claim 1, wherein the at least one additional environmental sensor is an attitude sensor.

3. The synthetic underwater visualization system of claim 1, wherein the at least one additional environmental sensor is a magnetic compass.

4. The synthetic underwater visualization system of claim 1, wherein the at least one additional environmental sensor is a GNSS receiver.

5. The synthetic underwater visualization system of claim 1, wherein the sonar subcomponents are attached to the floating platform such that it trails a predetermined length behind the floating platform.

6. The synthetic underwater visualization system of claim 1, wherein the LIDAR subcomponents are attached to the floating platform such that it trails a predetermined length behind the floating platform.

7. The synthetic underwater visualization system of claim 1, wherein the synthetic visualization of the water environment includes preprogrammed animated sequences of moving objects to create a more realistic appearing visualization.

8. A synthetic underwater visualization system, comprising:
   a fleet of individual reporting units, each individual reporting unit comprising:
      a floating platform,
      a plurality of sonar subcomponents attached to the floating platform, and
      a processor, wherein said processor is configured to operate and receive data from the sonar;
   a database, wherein the database is located remotely from the reporting units;
   a wireless communication means between the individual reporting units and the database,
   wherein the data received by the processor is transmitted by each individual reporting unit to the database over the wireless communication means, wherein the data thus transmitted is received by the database, used to update existing bathymetric data, and wherein the updated bathymetric data is transmitted back to each individual reporting unit;
   a plurality of Laser Identification Detection and Ranging (LIDAR) subcomponents, wherein the LIDAR subcomponents are attached to the floating platform;
   said processor being further configured to operate and receive data from the LIDAR subcomponents;
   a database, wherein said database is located remotely from the floating platform;
   a plurality of wireless communication subcomponents, wherein the wireless communication subcomponents are configured to allow the synthetic underwater visualization system to transmit environmental data received by and created from the sonar and the LIDAR subcomponents to the database for storage and assimilation, and to receive information from the database in the form of bathymetric maps updated with the data transmitted by the synthetic underwater visualization system;
   one or more additional remotely-located synthetic underwater visualization systems, wherein the additional remotely-located synthetic underwater visualization systems transmit environmental data to the database, wherein the database stores and assimilates the environmental data from the first synthetic underwater visualization system and the additional remotely-located synthetic underwater visualization systems into a common data set, and wherein the database transmits bathymetric maps that have been updated with the data transmitted by the first synthetic underwater visualization system and the additional remotely-located synthetic underwater visualization systems back to the first synthetic underwater visualization system and the additional remotely-located synthetic underwater visualization systems;

said processor being preprogrammed with animated sequences of moving objects to create a more realistic appearing visualization on said synthetic visualization systems;

said system including multiple, pre-programmed animated and interactive sequences of marine life stored in said processor, wherein said processor is configured for providing an output consisting of said animated and interactive sequences of said marine life resulting from detection of said marine life by a respective additional synthetic underwater visualization system;

wherein said system is configured for locating and tracking said detected marine life using GNSS-defined positions and compass headings;

said system output including an interactive touch-screen display and configured for displaying data associated with said detected marine life in response to operator interaction with said touch-screen display; and said system including an interactive function, wherein said interactive function is configured for affecting said marine life animated and interactive sequences in response to additional underwater stimuli detected by said additional synthetic underwater visualization system.

9. The synthetic underwater visualization system of claim 8, wherein the sonar subcomponents are attached to the floating platform such that it trails a predetermined length behind the floating platform.

10. The synthetic underwater visualization system of claim 8, wherein the LIDAR subcomponents are attached to the floating platform such that they trail a predetermined length behind the floating platform.

11. The synthetic underwater visualization system of claim 8, wherein each individual reporting unit further comprises a display, and wherein the display is used to present a synthetic visualization of the water environment to an operator.

* * * * *